(12) United States Patent  
Ansamaa

(10) Patent No.: US 7,181,193 B2
(45) Date of Patent: Feb. 20, 2007

(54) GENERATING CHARGING INFORMATION IN A COMMUNICATION SYSTEM

(75) Inventor: Jarkko Ansamaa, Helsinki (FI)

(73) Assignee: Nokia Corporation, Espoo (FI)

( * ) Notice: Subject to any disclaimer, the term of this patent is extended or adjusted under 35 U.S.C. 154(b) by 133 days.

(21) Appl. No.: 10/824,565

(22) Filed: Apr. 15, 2004

(65) Prior Publication Data

US 2005/0181758 A1 Aug. 18, 2005

(30) Foreign Application Priority Data

Feb. 13, 2004 (FI) .................................. 20040240

(51) Int. Cl.
*H04M 11/00* (2006.01)

(52) U.S. Cl. ...................... 455/406; 455/436; 455/440; 455/442; 455/445; 370/349; 370/352; 370/397

(58) Field of Classification Search ................ 455/406, 455/436, 440, 442, 415, 408, 426.1, 432.1; 370/349, 352, 397
See application file for complete search history.

(56) References Cited

U.S. PATENT DOCUMENTS 6,041,231 A * 3/2000 Suzuki .................... 455/435.1

| | | | |
|---|---|---|---|
| 6,064,887 A * | 5/2000 | Kallioniemi et al. ....... | 455/445 |
| 6,097,945 A * | 8/2000 | Evensen et al. .......... | 455/422.1 |
| 6,188,902 B1 * | 2/2001 | Yamada ...................... | 455/445 |
| 6,654,599 B1 | 11/2003 | Lundström et al. | |
| 2002/0046090 A1 * | 4/2002 | Stewart ...................... | 705/14 |
| 2002/0072369 A1 * | 6/2002 | Sasada et al. ............... | 455/435 |
| 2002/0091632 A1 * | 7/2002 | Turock et al. ............... | 705/39 |
| 2002/0138691 A1 * | 9/2002 | Yamamoto et al. ......... | 711/112 |
| 2002/0193125 A1 | 12/2002 | Smith | |

FOREIGN PATENT DOCUMENTS

WO WO 02/13567 A1 2/2002
WO WO0213567 A1 * 2/2002

* cited by examiner

*Primary Examiner*—Lester Kincaid
*Assistant Examiner*—Diego Herrera
(74) *Attorney, Agent, or Firm*—Squire, Sanders & Dempsey, LLP.

(57) ABSTRACT

A method for generating charging information in a communication system is disclosed. The method includes providing a gateway with information regarding a time zone of a user equipment provided with network access by an access entity. The method also includes providing a service for the user equipment via the access entity and the gateway and generating charging information based on the information regarding the time zone for charging for the service.

22 Claims, 7 Drawing Sheets

|  | Bits | | | | | | | |
|---|---|---|---|---|---|---|---|---|
| Octets | 8 | 7 | 6 | 5 | 4 | 3 | 2 | 1 |
| 1 | Type | | | | | | | |
| 2 | Sign | | | | O_hh | | | |
| 3 | O_mm | | | | S_MM | | | |
| 4 | S_DD | | | | S_hh | | | |
| 5 | S_mm | | | | E_MM | | | |
| 6 | E_DD | | | | E_hh | | | |
| 7 | E_mm | | | | spare | | | | sign = +/-
MM = month
DD = day
hh = hours
mm = minutes
O_ = offset
S_ = start of D
E_ = end of D

Fig. 7

GENERATING CHARGING INFORMATION IN A COMMUNICATION SYSTEM

FIELD OF THE INVENTION

The invention relates to communication systems, and more particularly to generating charging information for charging services provided by means of a communication system.

BACKGROUND OF THE INVENTION

A communication system can be seen as a facility that enables communication sessions between two or more entities such as user terminal and/or other nodes associated with the communication system. Subscribers, such as the users, to a communication system may be offered and provided numerous services, such as two-way or multi-way calls, data communication or multimedia services or simply an access to a network, such as the Internet.

There may be various ways of pricing the services in a communication system. A service provider may wish to price services depending on the time when the service is consumed. Traditionally in fixed telephony, the price of a call may be different in the busy hours of the day (so-called on-peak hours) and in the non-busy hours, like weekends and non-office hours (off-peak hours).

Wireless data communication networks, such as general packet radio service (GPRS), universal mobile telecommunications system (UMTS), wireless local area network (WLAN) and so on, provide typically mobility for the users thereof. A subscriber may use services in the home network provided by an operator, so-called home operator, with which the subscriber has a subscription. The subscriber may also use services when located in a network provided by another operator, i.e. when the subscriber is roaming in a visited network. The home operator may have roaming agreements with several network operators that provide connectivity to the subscriber when the subscriber is not in the home network area. Typically, when the subscriber is roaming in another network, the operator of the visited network settles the roaming charges with the home operator according their roaming agreement for example on a monthly basis. The home operator then charges the subscriber for the roaming service.

A subscriber may be a prepaid or post-paid subscriber. A prepaid subscriber typically has a prepaid account where credit is deposited. When services are used, the value of the services is deducted from the prepaid account in real-time. A post-paid subscriber typically receives a bill, for example on a monthly basis, for the services used.

It may be desired to use the idea of charging services depending on the time when the service is consumed. This might be desired also in relation to other services than calls and also in the wireless packet data communication networks, such as the GPRS, UMTS, WLAN and so on. However, when using services, a subscriber of a wireless data communication network may be located in the area of any operator having a roaming agreement with the home operator of the subscriber, as was explained above. The service provider may also be located anywhere, an example being the home operator and another a service provider located in another network.

When the subscriber is located remote from the service provider, for example in a different network, the time zone relating to the subscriber and to the service provider may be different from each other. The service provider may not be aware of the location of the subscriber or the time zone relating to the location of the subscriber. This may lead, for example, to a situation where the subscriber believes to be using a service priced according to a lower tariff, but the service provider charges according to a higher tariff and vice versa.

In some situations it might be desired to have charging information immediately available, for example when a prepaid subscriber is concerned. Some services may not be useable without checking the prepaid account balance first. Therefore, it may be important to know the exact price of the service in advance in order to be able to verify the balance.

These problems arise as an increasing number of various services are offered in the wireless packet data communication networks. Earlier in the fixed and wireless circuit data networks, such as the global system for mobile communications (GSM), the services and charging models have been limited and the network topology has enabled time-based tariffs within a network of an operator. End user charges for roaming have typically been bound to the visited networks without time-based tariffs.

There is therefore a need for an improved method for charging in a communication system.

It shall be appreciated that these issues are not limited to any particular communication environment, but may occur in any communication system.

SUMMARY OF THE INVENTION

Embodiments of the invention aim to address one or several of the above problems or issues.

In accordance with an aspect of the invention, there is provided a method for generating charging information in a communication system, the method comprising providing a gateway with information regarding a time zone of a user equipment provided with network access by an access entity, providing a service for the user equipment via the access entity and the gateway and generating charging information based on said information regarding the time zone for charging for the service.

The method may further comprise providing the user equipment with an access to the service through an access entity of a first network to a gateway of a second network, the service being provided in the second network, generating, in the access entity of the first network, subscriber information comprising a time zone indication, transmitting the subscriber information from the access entity of the first network to the gateway of the second network and generating charging information for charging for the service based on the time zone indication.

In an embodiment, the method may further comprise verifying, based on said information regarding the time zone, whether a service may be provided for the user equipment.

In an embodiment, the verifying step may comprise verifying if a subscriber of the user equipment is entitled to receive the service. A subscriber of the user equipment may be provided with a prepaid account and managing the prepaid account in connection with the gateway. The verifying step may then comprise verifying if the prepaid account possesses enough prepaid resources for receiving the service.

The step of providing the user equipment with access to the service may comprise providing a communication media from a visited network to a service provider located in a home network of the user equipment.

The method may further comprise generating said information regarding the time zone by mapping a time zone of the Greenwich Mean Time to the location of the user equipment.

The step of providing the gateway with the information regarding the time zone may comprise sending the information from the access entity to the gateway. Sending the information may comprise transmitting the information in a message of a packet data protocol context.

In an embodiment, the step of providing the gateway with the information regarding the time zone may comprise providing the gateway with information for mapping an access entity address with a time zone for at least one access entity the gateway interfaces with.

In an embodiment, the step of providing the gateway with the information regarding the time zone may comprise providing the gateway with a table comprising information for mapping a user location received from an access entity with a time zone for at least one user location.

The method may further comprise pricing the service in function of the time of the day when the service is provided.

In accordance with another aspect of the invention, there is provided a communication system comprising an access entity configured to provide network access for a user equipment and to provide information regarding a time zone, a gateway configured to receive said information regarding the time zone and means for providing a service for the user equipment via the access entity and the gateway, the communication system being configured to use said information regarding the time zone in generating charging information for charging for the service.

The communication system may further comprise a first network comprising the access entity, a second network configured to provide the service and comprising the gateway, the access entity of the first network comprising subscriber information generating means configured to generate subscriber information comprising a time zone indication and subscriber information transmitting means configured to transmit the subscriber information from the access entity to the gateway of the second network and the communication system further comprising charging information generating means configured to generate charging information for charging the service based on the time zone information.

In an embodiment, the communication system may further comprise verifying means configured to verify, based on said information regarding the time zone, whether the service may be provided.

The first network may comprise a visited network and the second network may comprise a home network relating to a subscriber of the user equipment. The access entity may comprise a serving general packet radio service support node and the gateway may comprise a gateway general packet radio service support node.

In an embodiment, a subscriber of the user equipment may possess a prepaid account to be used in charging the service.

In accordance with another aspect of the invention, there is provided an access entity configured to generate subscriber information comprising a time zone indication relating to the location of a user equipment being in connection with the access entity and transmit the subscriber information from the access entity to a gateway of another network.

In accordance with another aspect of the invention, there is provided a gateway configured to provide charging information using information regarding a time zone of a user equipment provided a network access by an access entity of another network.

In accordance with another aspect of the invention, there is provided a gateway configured for mapping with a time zone an access entity address at least one access entity of another network the gateway interfaces with.

In accordance with another aspect of the invention, there is provided a gateway, configured for mapping with a time zone a user location received from an access entity of another network.

BRIEF DESCRIPTION OF THE DRAWINGS

The invention will now be described in further detail, by way of example only, with reference to the following examples and accompanying drawings, in which:

FIG. 7 shows an example of a user location time zone information element according to an embodiment of the invention.

DETAILED DESCRIPTION OF PREFERRED EMBODIMENTS

Embodiments of the invention are now described more in detail referring to the systems defined by the third generation partnership project (3GPP), such as the GPRS and the UMTS communication systems. It shall be noted that the same generic inventive concept for generating charging information based on the subscriber's location time zone may be implemented with other communication systems as well.

Figure 1:
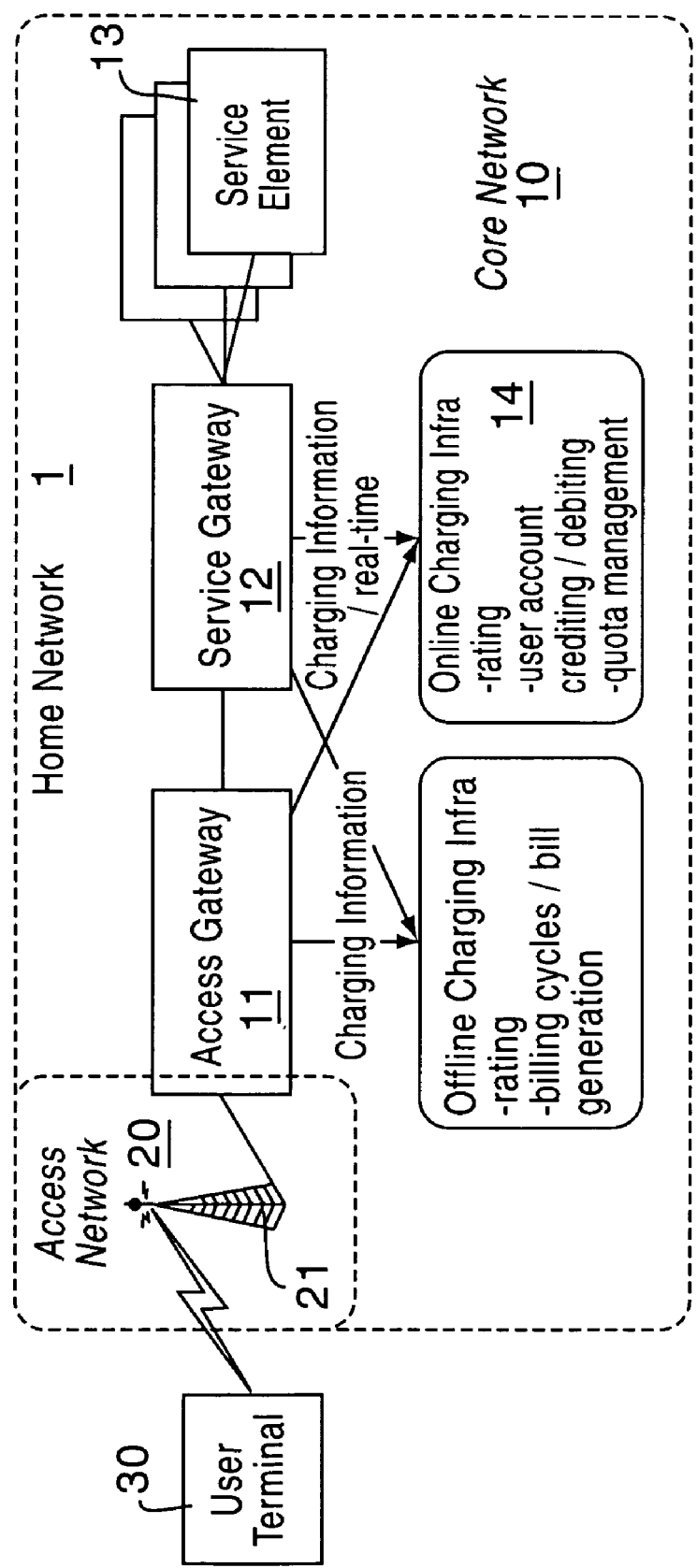
FIG. 1 shows an example of a network architecture in which the embodiments of the invention may be implemented.
Figure 2:
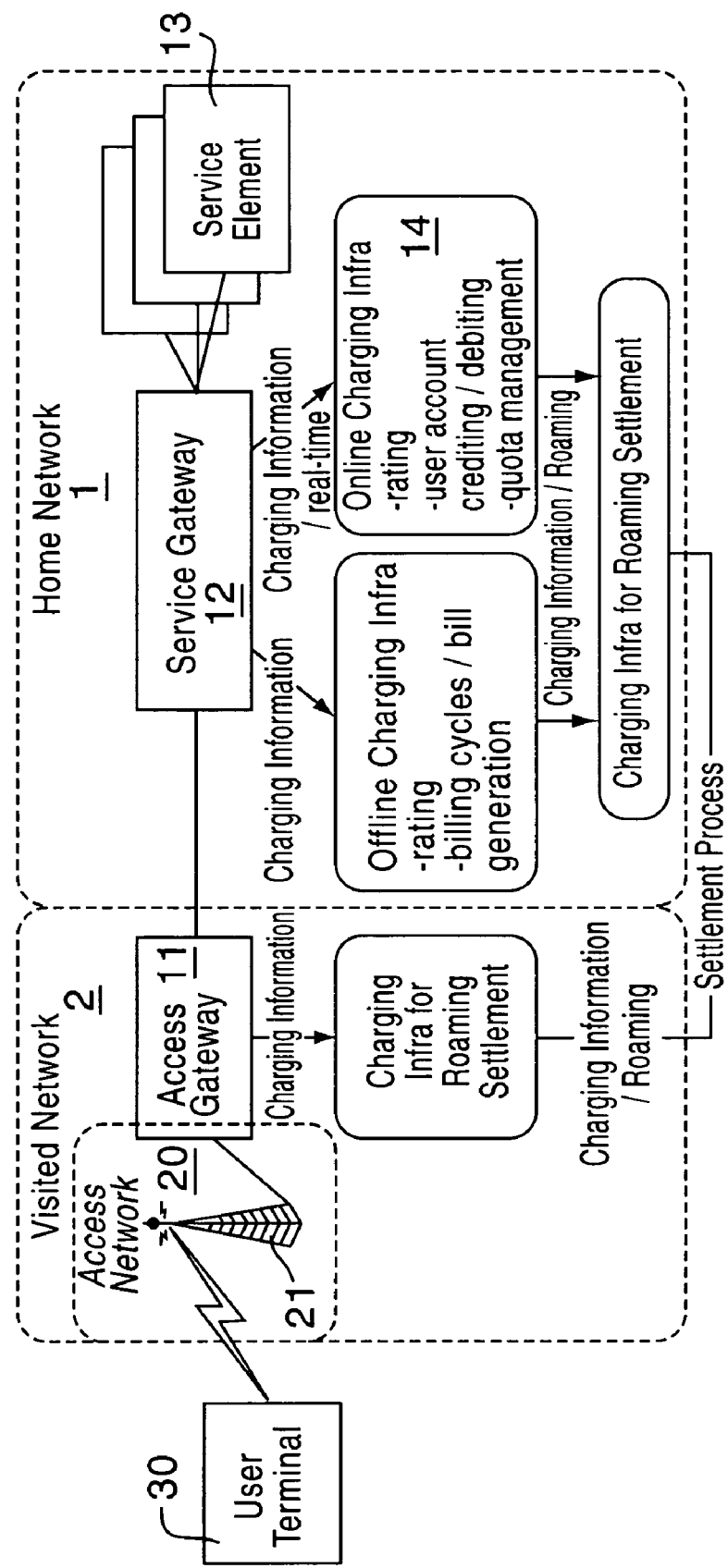
FIG. 2 shows a further example of a network architecture in which the embodiments of the invention may be implemented.

FIGS. 1 and 2 show examples of a network architecture in which embodiments of the invention may be implemented. A network typically consists of an access network (AN) 20, such as a radio access network (RAN), taking care of the user's connectivity and a core network (CN) 10, where the services are provided. Both the access network 20 and the core network 10 may be provided by the home network of the subscriber, as is shown in FIG. 1. In a roaming situation, the access network 20 is typically provided by a visited network, as is shown in FIG. 2. In a roaming situation, both the visited network 2 and the home network 1 may provide functionalities of the core network. In further embodiments, a service provider may be situated in the same or in another visited network.

In the arrangements of FIGS. 1 and 2, a transceiver network element 21, such as a base station or Node B, is arranged to transmit signals to and receive signals from a user terminal 30 of a mobile user via a wireless interface between the user terminal 30 and the access network 20. Correspondingly, the user terminal 30 is able to transmit signals to and receive signals from the access network 20 via the wireless interface. The user terminal 30 may access the core network 10 via the access network 20.

It shall be appreciated that, although for clarity reasons FIGS. 1 and 2 show a transceiver network element of only one access network, a typical communication network system usually includes a number of access networks. Correspondingly, it shall be appreciated that although only one user terminal is shown in FIGS. 1 and 2 for clarity, a number of user terminals may be in simultaneous communication with base stations of a mobile communication system.

The access network is typically controlled by appropriate controller network elements, such as a radio network controller (RNC). These controllers are not shown in FIGS. 1 and 2 in order to enhance clarity. A controller may be assigned for each transceiver network element or a controller can control a plurality of transceiver network elements, for example in the radio access network level. It shall thus be appreciated that the name, location and number of the controller network elements depend on the system.

The core network entities typically include various switching and other control entities and gateways for enabling the communication via a number of access networks and also for interfacing a single communication system with one or more communication systems, such as with other cellular systems and/or fixed line communication systems. The access network 20 is typically connected to an appropriate core network entity or entities enabling the user terminal to access the network. In FIG. 1 the access entity is provided by means of an access gateway 11. In the 3GPP systems, the access gateway 11 may comprise a serving general packet radio service support node (SGSN). The access gateway 11, in turn, may communicate with a gateway 12, such as a gateway GPRS support node (GGSN). In the following examples the gateway is referred for clarity reasons as a service gateway.

In a 3GPP network, a packet data session is established to carry traffic flows over the network. Such a packet data session is often referred to as a packet data protocol (PDP) context. A PDP context may include a radio bearer provided between the user terminal and the radio network controller, a radio access bearer provided between the user terminal, the radio network controller and the SGSN, and switched packet data channels provided between the SGSN and the GGSN. Each PDP context usually provides a communication pathway between a particular user terminal and the GGSN and, once established, can typically carry multiple flows. Each flow normally represents, for example, a particular service and/or a media component of a particular service. The PDP context therefore often represents a logical communication pathway for one or more flow across the network. To implement the PDP context between user terminal and the SGSN, radio access bearers (RAB) need to be established which commonly allow for data transfer for the user terminal. The implementation of these logical and physical channels is known to those skilled in the art and is therefore not discussed further herein. Similar arrangements may exist and be created in other communication systems as well.

Typically, charging information relating to a communication session is gathered for the use of the access network, the use of the core network and the use of the services provided in the core network. The entities gathering the information may be the access gateway 11 and the service gateway 12. The services may be provided by service elements 13 located for example in the home network, as shown in FIGS. 1 and 2, or in another network.

In an embodiment, the subscriber may have a prepaid account storing payment resources for using services. Typically, the payment resources are prepaid money on the prepaid account, which may be managed by an operator of the home network of the subscriber or some other appropriate entity.

Charging infrastructure may include a rating function determining, for example, the monetary value for a service for a particular subscriber. The rating function and the prepaid account may reside in an online charging system (OCS) 14 in the home network for the prepaid subscribers. The service gateway 12 being in connection with service elements 13 may request quota from the online charging system 14 prior to service usage. The quota may be based on the monetary value of the service to be used. For post-paid subscribers the charging information may be delivered after the service usage.

Service gateway 12 may authorize the service usage and monitor the service consumption. As a part of authorization process for the prepaid subscribers, the prepaid account of the subscriber is checked for credit. For post-paid subscribers the service gateway 12 may generate charging information, which is then further processed to billable items in subscriber's bill.

An important function in charging process is rating, where the price of the service is determined. The price can be a combination of several items such as service type, service duration, data volume, and so on. The time of the day, week, year or specific day when the service is used may also affect the pricing. This may lead to problems when the subscriber is located in a different time zone than the service gateway 12 reporting the time to the charging infrastructure. The service gateway 12 may not be aware of the subscriber's location, in particular in terms of time zones. Therefore, the time as measured by the subscriber and the time as measured by the service gateway may be different and thus the user may be charged incorrectly based on incorrect time information. This may apply especially when the subscriber is roaming or when the subscriber's home operator network expands over several time zones. The following example will illustrate the situation more clearly.

As an example, a subscriber is roaming in England while the home operator and the service gateway are located in Finland. The subscriber subscribes to a service having a special discounted price on Valentine's Day. The subscriber uses the service shortly before the midnight Valentine's Day, for example at 11.45 p.m. on the Valentine's Day. The service gateway initiates the charging process reporting that the service was used at 01.45 a.m. on the next day, the local time in Finland being two hours in advance compared to England in accordance with the Greenwich Mean Time (GMT). The subscriber may then be incorrectly overcharged for the service if no additional indication of the time zone location of the subscriber or the like is provided with the service gateway.

It should be noted that the sometimes the charging of specific service should be based on the time zone where the service provider is located. This may typically be the time zone of the home network operator. Whether the location of the user or the location of the service provider is used depends on the charging model of the operator for the particular service.

Referring back to FIGS. 1 and 2, when a communication session for user traffic is set-up, the access gateway 11 typically negotiates with the service gateway 12 for authentication and/or authorization of the user, set-up parameters and so on. Once a connection between the user terminal and the service gateway is established, charging information generation should start. However, the service gateway 12 may not be aware of the time zone where the user is located in.

Alternative implementations of charging can be illustrated by comparing FIGS. 1 and 2. FIG. 1 shows a situation where the user terminal is located in the home network and in FIG. 2 the user terminal is located in a visited network. The online charging system 14 is, in both cases, connected to the service gateway 12 of the home network 1.

In the arrangement of FIG. 1, the access gateway 11 is in connection with the user terminal 30 via the access network 20. The online charging system 14 relating to the user terminal 30 is in the same network than the access gateway 11, i.e. in the home network 1. In this arrangement, the access gateway 11 may send real-time charging information directly to the online charging system 14.

FIG. 2 shows a situation, where the access gateway 11 being in connection with the user terminal 30 via the access network 20 is in another network than the online charging system 14. In the arrangement of FIG. 2, the access gateway 11 is in the visited network 2 and the online charging system 14 is again in the home network 1. The access gateway 11 sends charging information based on roaming agreements to the home network 1, for example as traditional approval process call detail records (TAP-CDR). The charging information is then processed further in the home network 1. However, real-time charging is not possible, as the time before receiving the TAP-CDRs in the home network the TAP-CDRs may be quite long. The TAP-CDRs may also be sent through a third party, such as a clearing house. This may be a problem in some embodiments, such as when the subscriber is a prepaid subscriber or the monthly usage of the user is limited. In some embodiments, the charging information should be immediately available in the online charging system 14.

It has now been found that the service gateway 12 should be made aware of the time zone where the user is located in. This may be realised using a feature of wireless communication systems of a transceiver network element knowing the identity of user terminal being served in the area of service of said transceiver network element, such as in a cell served by said transceiver network element. Thus, in wireless communication systems, an access gateway 11 typically becomes aware of the location of a subscriber at least in the accuracy of a transceiver network element 21, when the subscriber is in connection with the access gateway 11 from a user terminal 30 through an access network 20.

In accordance with an embodiment of the invention, an access gateway 11 may implement a mapping of the user location to a time zone. If the access gateway 11 controls an area within a single time zone, this may be fairly simple. An access gateway 11 controlling the area expanding over several time zones needs to know the time zones of each of the controlled sub-areas. A sub-area may consist of a group of cells in a cellular network, such as routing area or location area.

When the connection for the user traffic is set-up, the access gateway 11 may send a message comprising information about the resolved user location time zone to the respective service gateway 12. The service gateway 12 may thus become aware of the time at the location of the user before the connection is established, thereby enabling generating charging information based on the time at the location of the user. Knowing the time before establishing the connection may be important in particular when a prepaid subscriber is concerned.

The present invention thus provides a method for generating charging information in a communication system, in which method a gateway is provided with information regarding a time zone indication for a user equipment provided with network access by an access entity, providing a service for the user equipment via the access entity and the gateway; and generating charging information based on said information regarding the time zone for charging for the service.

Figure 3:
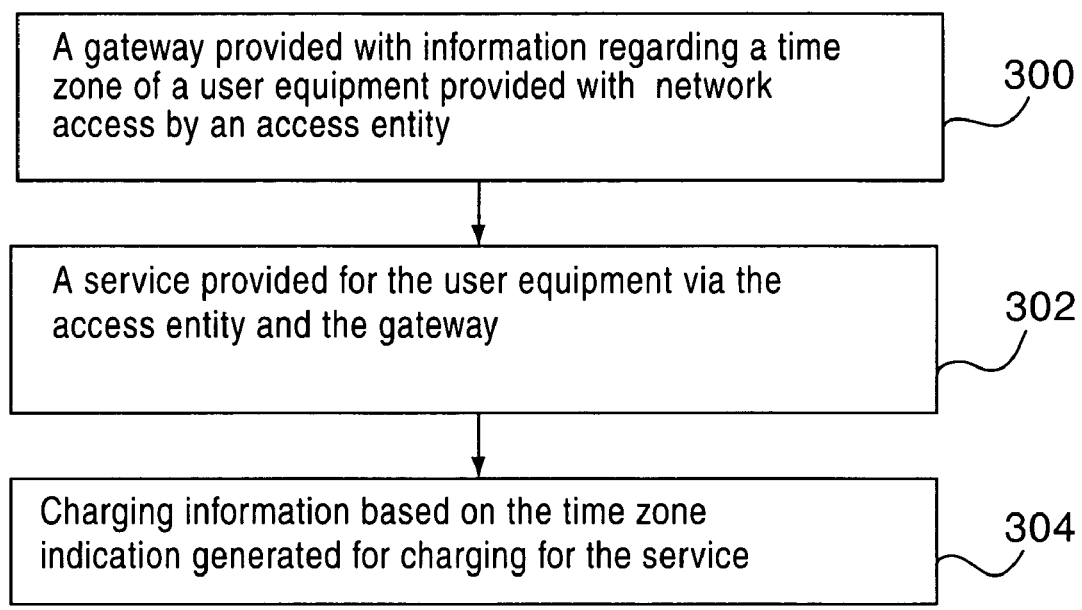
FIG. 3 shows a flow chart illustrating an embodiment of the invention.

FIG. 3 shows a flow chart illustrating an embodiment of the invention. In step 300, a gateway is provided with information regarding a time zone of a user equipment provided with network access by an access entity. In step 302, a service is provided for the user equipment via the access entity and the gateway. In step 304, charging information for charging for the service is generated based on the time zone indication.

Figure 4:
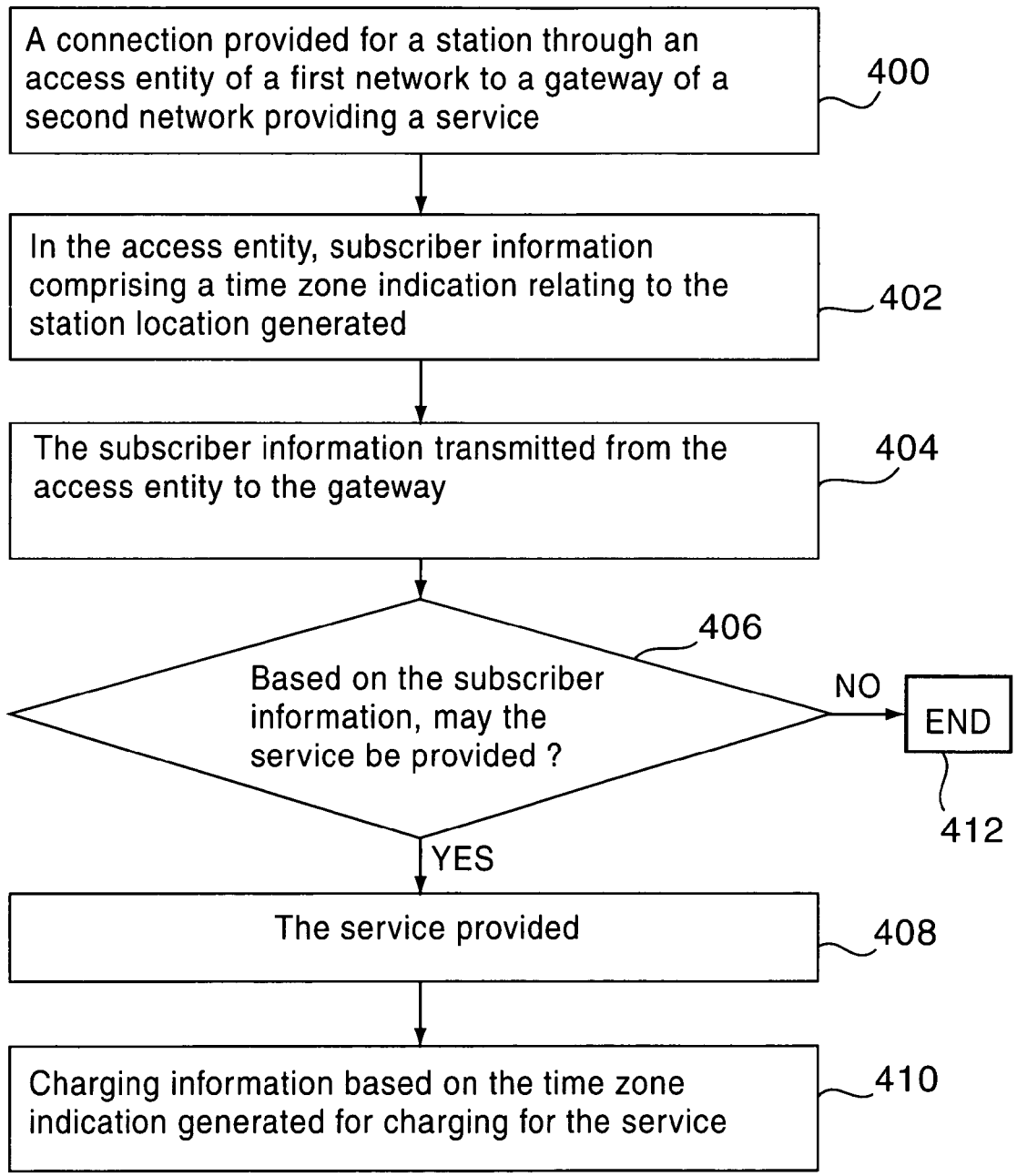
FIG. 4 shows a flow chart illustrating a further embodiment of the invention.

FIG. 4 shows a flow chart illustrating an embodiment of the invention. In step 400, a connection is provided for a station through an access entity of a first network to a gateway of a second network providing a service. The first network is preferably a visited network and the second network is preferably a home network of a subscriber using the station. The service may also originate a service provider situated outside the second network but being in real-time connection with the second network.

In step 402, in the access entity, subscriber information comprising a time zone indication relating to the station location is generated. In the preferred embodiment described above, the time zone is thus the time zone of the visited network.

In step 404, the subscriber information is transmitted from the access entity to the gateway.

In step 406, which may be optional, it is verified, based on the subscriber information, if the service may be provided. This verification may be done to check if the subscriber has subscribed the requested service or if the subscriber is entitled to receive the requested service. In an embodiment, the subscriber is a prepaid subscriber and the verification is done to check if the subscriber has enough prepaid resources to receive the service.

If the verification shows that the service may be provided, the service is provided, in step 408.

In step 410, charging information for charging the service is generated based on the time zone indication. The service may thus be priced in function of the time of delivery and the charging may be carried out based on the location, in terms of the time zone, of the station using the service. For example, for the prepaid subscribers, it is important that the time zone indication is received in the gateway prior to providing the service, thereby enabling correct reservation or deduction of resources from the prepaid account.

If the verification of step 406 shows that the service may not be provided, the procedure may continue in any appropriate manner. The procedure may just end, in step 412, by not providing the service. Preferably, an announcement or notice is sent to the station requiring the service to indicate that the service may not be provided. This announcement or notice may comprise various types of information depending, for example, on the reason why it was not possible to provide the service.

Figure 5:
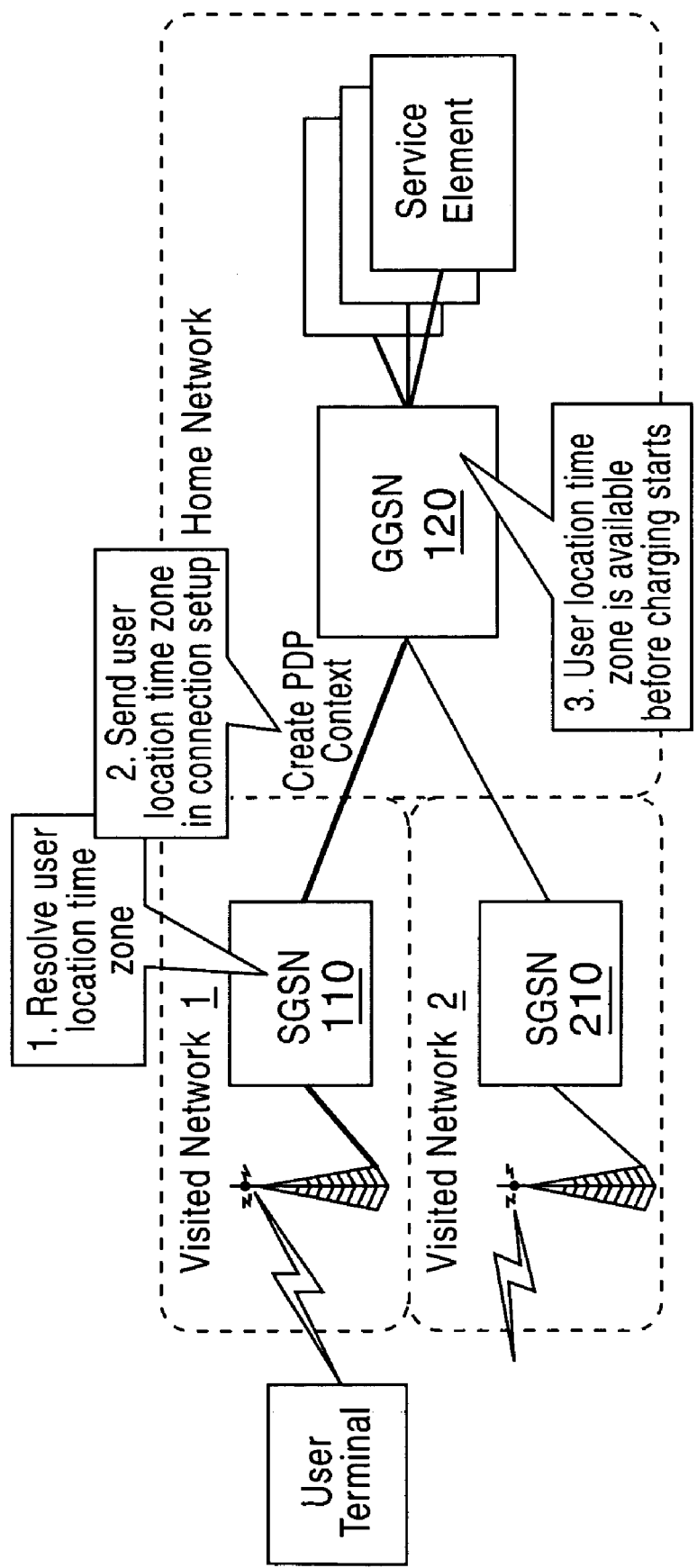
FIG. 5 shows an embodiment of the invention.
Figure 6:
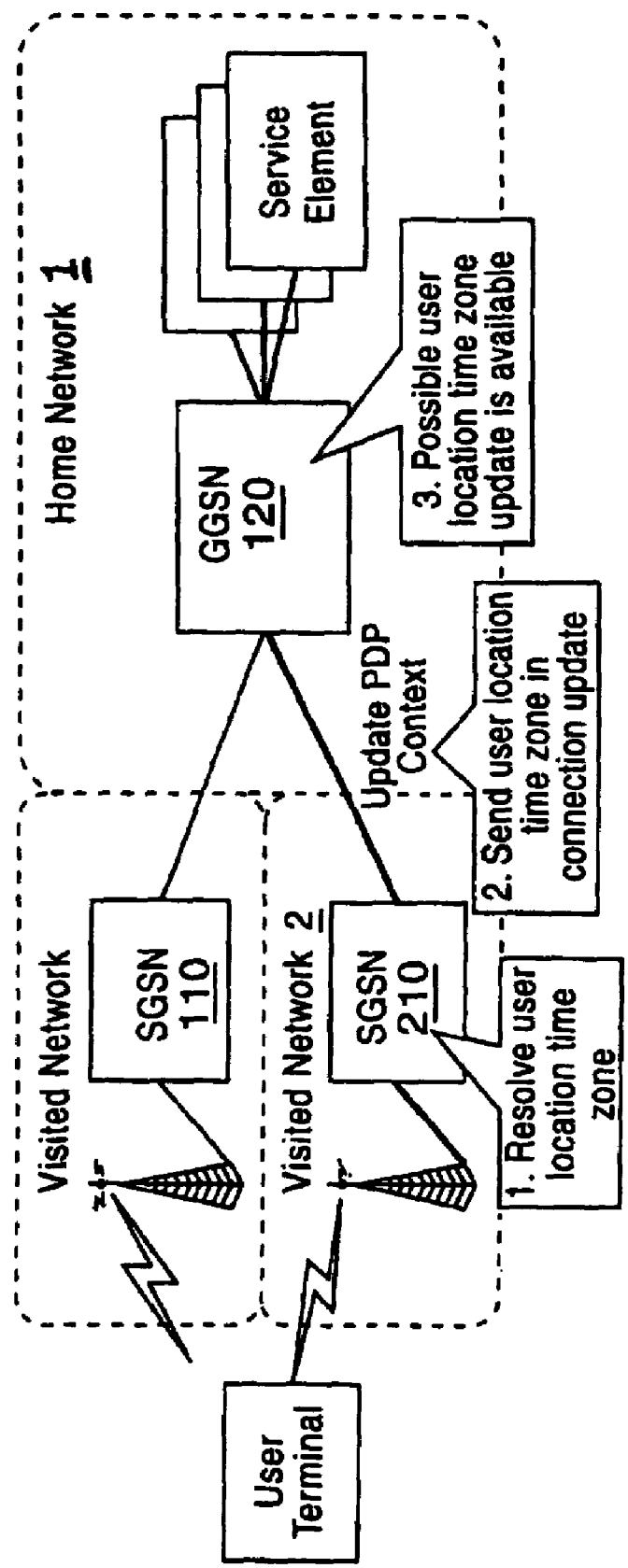
FIG. 6 shows a further embodiment of the invention.

In the following, exemplifying embodiments are described in the 3GPP environment, such as the GPRS or UMTS. Reference is now made to FIGS. 5 and 6. In the 3GPP environment, a SGSN 110 takes care of the user's connectivity and is aware of users location in the access network. The SGSN 110 negotiates with a GGSN 120 when a PDP context is created for the user traffic. Upon SGSN handover to a second visited network, a new SGSN 210 negotiates with the GGSN 120 for the PDP context transfer. The protocol used in the negotiation may be the GPRS Tunnelling Protocol (GTP)—Control over Gn interface and the GTP messages used by SGSNs may be "Create PDP Context Request" and "Update PDP Context Request" respectively.

In the embodiments of FIGS. 5 and 6, the SGSN 110, 210 has to resolve the time zone of the user location by mapping the location of the user, known for example in the accuracy of a Node B, to a time zone. The SGSN 110, 210 then transfers this information, for example in the "Create PDP Context Request" message and "Update PDP Context Request" message to the GGSN 120. The GGSN 120 can then utilise said information in the charging procedure initiated by the GGSN 120, thereby enabling charging models based on time-based tariffs.

The GTP messages "Create PDP Context Request" and "Update PDP Context Request" are sent from the SGSN 110, 210 to the GGSN 120 when a PDP context is opened, as shown in FIG. 5, or when the SGSN is changed during an open PDP context, as shown in FIG. 6. The requests consist of a header and information elements (IE) being mandatory, conditional or optional. A new information element, called "user location time zone", may be created to carry out embodiments of the invention. The user location time zone IE may consist of the user's local time offset from the GMT and the information about the daylight saving time (DST) period. The GGSN 120 stores this information for the PDP context. The GGSN 120 can calculate the user's local time based on its own clock and the user location time zone IE and use it for charging. An example of a user location time zone IE is given in FIG. 7.

In the above embodiment, it is assumed that the access network area the SSGN serves is within a single time zone, so a SGSN may send the same user location time zone IE to each GGSN being interconnected with said SGSN. In an embodiment in which the area expands to several time zones, the SGSN needs to resolve the correct zone by investigating the routing area information it holds. When a user moves to a different time zone within the same SGSN, an update towards the GGSN is issued.

The user location time zone IE may be combined with other mechanisms relating, for example, to the PDP context or the charging information generation. For example, the gateway, in other words the service gateway, such as GGSN, may contain a list of every access entity, such as SGSN, it interfaces with and the time zone information for each such access entity for the purposes of time zone mapping.

In an embodiment, the service gateway knows which access entity is serving the user. If the access entities serve relative small geographical areas meaning that the area does not expand over time zones, the service gateway can have a mapping table from the address of the access entity (for example access entity IP address) to a time zone for each access entity it interfaces with. The service gateway can then resolve the user location time zone based on the access entity address. This method may require that access entity area does not expand over time zones and that the mapping table at the service gateway is constantly kept up to date.

In an embodiment, the access entity may send the user location information to the service gateway. The service gateway may have a mapping table from the possible user locations to corresponding time zones. The service gateway can then resolve the user location time zone based on the user's location information the access entity has provided. The mapping table at the service gateway should be constantly kept up to date. In this embodiment, the GTP requests "Update PDP Context Request" and "Create PDP Context Request" may be sent by SGSN to GGSN when a PDP context is opened or when the SGSN changes during an open PDP context. The requests may consist of a header and information elements (IE) that are mandatory, conditional or optional. An existing optional IE, "Routing Area Identity" may be included as a mandatory element. Alternatively a new IE identifying a cell by a Cell ID or a cell group by a Cell Group ID (CGI) may be included to the requests. The GGSN may then compare the location information to a mapping table of locations and time zones. Based on this table GGSN may resolve the user's local time and use it for charging. As the location may change during the PDP context, additional messages for SGSN to GGSN updating the location information may be needed.

In an embodiment, the time zone information may be stored in a subscriber information register, such as a home location register (HLR), home subscriber server (HSS) or Internet protocol multimedia register (IMR). The time zone information may then be fetched from the register by an appropriate network element, such as a charging system or a rating engine. The subscriber register may be updated regularly after the location updates the SGSN signals for a user towards the GGSN. The SGSN may indicate the time zone in the location update messages.

In an embodiment, a world time server may be used to a map country code to the respective local time. Summer time switch in different zones may also be included in this information.

It should be appreciated that whilst embodiments of the present invention have been described in relation to mobile user equipment such as mobile terminals, embodiments of the present invention are applicable to any other type of mobile user equipment that may access services via gateways.

The examples of the invention have been described in the context 3GPP networks. However, this invention is also applicable to any other standards. Furthermore, although the given examples are described in the context of communication channels known as PDP contexts, the invention is also applicable to any other appropriate communication media or protocol.

Although the invention has been described in the context of particular embodiments, various modifications are possible without departing from the scope and spirit of the invention as defined by the appended claims. For example, the communication system may be any appropriate communication system. Thereby, the network entities mentioned in various embodiments may be called with different names in various communication systems. These entities may also carry out various additional tasks. It may also be possible that the network entities are dedicated for the purposes of the embodiments of the invention.

The invention claimed is:

1. A method comprising:
providing a user equipment with an access to a service through an access entity of a first network to a gateway of a second network, the service provided in the second network, the user equipment being in a different time zone than the gateway of the second network;
generating subscriber information comprising a time zone indication of the user equipment in the access entity of the first network;

transmitting the subscriber information from the access entity of the first network to the gateway of the second network; and generating charging information for charging for the service based on the time zone indication.

2. A method according to claim 1, further comprising:
verifying whether the service is providable for the user equipment based on said time zone indication.

3. The method according to claim 2, wherein the verifying comprises verifying whether a subscriber of the user equipment is entitled to receive the service.

4. The method according to claim 3, further comprising:
providing the subscriber of the user equipment with a prepaid account; and
managing the prepaid account in connection with the gateway.

5. The method according to claim 4, wherein the verifying comprises verifying whether the prepaid account possesses enough prepaid resources for receiving the service.

6. A method according to claim 1, wherein the providing the user equipment with access to the service comprises providing a communication media from a visited network to a service provider located in a home network of the user equipment.

7. A method according to claim 1, further comprising:
generating said time zone indication by mapping a Greenwich Mean Time time zone to a location of the user equipment.

8. A method according to claim 1, wherein the providing the gateway with the time zone indication comprises sending the time zone indication from the access entity to the gateway.

9. A method according to claim 8, wherein the sending the time zone indication comprises transmitting the time zone indication in a message of a packet data protocol context.

10. A method according to claim 1, wherein the providing the gateway with the time zone indication comprises providing the gateway with information for mapping an access entity address with the time zone for at least one access entity with which the gateway interfaces.

11. A method according to claim 1, wherein the providing the gateway with the time zone indication comprises providing the gateway with a table comprising information for mapping a user location received from the access entity with a time zone for at least one user location.

12. The method according to claim 1, further comprising:
pricing the service according to a function of a time of the day when the service is provided.

13. A communication system, comprising:
a first network comprising an access entity configured to provide network access for a user equipment; and
a second network comprising a gateway and configured to provide a service for the user equipment via the access entity and the gateway,
wherein the access entity of the first network comprises subscriber information generating means configured to generate the subscriber information comprising a time zone indication and subscriber information transmitting means configured to transmit the subscriber information from the access entity to the gateway of the second network,
the communication system further comprising charging information generating means configured to generate the charging information for charging for the service based on the time zone indication, and
wherein the gateway is configured to receive the time zone indication.

14. A communication system according to claim 13, further comprising:
verifying means configured to verify whether the service is providable based on the time zone indication.

15. A communication system according to claim 13, wherein the first network comprises a visited network and the second network comprises a home network relating to a subscriber of the user equipment.

16. A communication system according to claim 13, wherein the access entity comprises a serving general packet radio service support node and the gateway comprises a gateway general packet radio service support node.

17. A communication system according to claim 13, wherein a subscriber of the user equipment possesses a prepaid account to be used in charging the service.

18. An access entity in a first network, wherein the access entity is configured to:
generate subscriber information comprising a time zone indication relating to a location of a user equipment in connection with the access entity; and
transmit the subscriber information from the access entity to a gateway of a second network;
wherein the second network is configured to provide a service for the user equipment via the access entity and the gateway, and the gateway is in a different time zone than the user equipment.

19. A gateway configured to:
provide charging information using information regarding a time zone indication of a user equipment,
wherein the gateway is in a second network and the user equipment is provided with the network access by an access entity of a first network, and
wherein the second network is configured to provide a service for the user equipment via the access entity and the gateway, and the gateway is in a different time zone than the user equipment.

20. A gateway according to claim 19, configured for mapping with a time zone, the gateway comprising an address of the access entity of the first network with which the gateway interfaces.

21. A gateway according to claim 19, configured for mapping a user location received from the access entity of the first network with a time zone.

22. A communication system, comprising:
a first network comprising an access entity configured to provide network access for a user equipment; and
a second network comprising a gateway and configured to provide a service for the user equipment via the access entity and the gateway,
wherein the access entity of the first network is configured to generate subscriber information comprising a time zone indication and to transmit the subscriber information from the access entity to the gateway of the second network,
wherein the communication system is configured to generate the charging information for charging for the service based on the time zone indication, and
wherein the gateway is configured to receive the time zone indication.

* * * * *